Patented Aug. 15, 1944

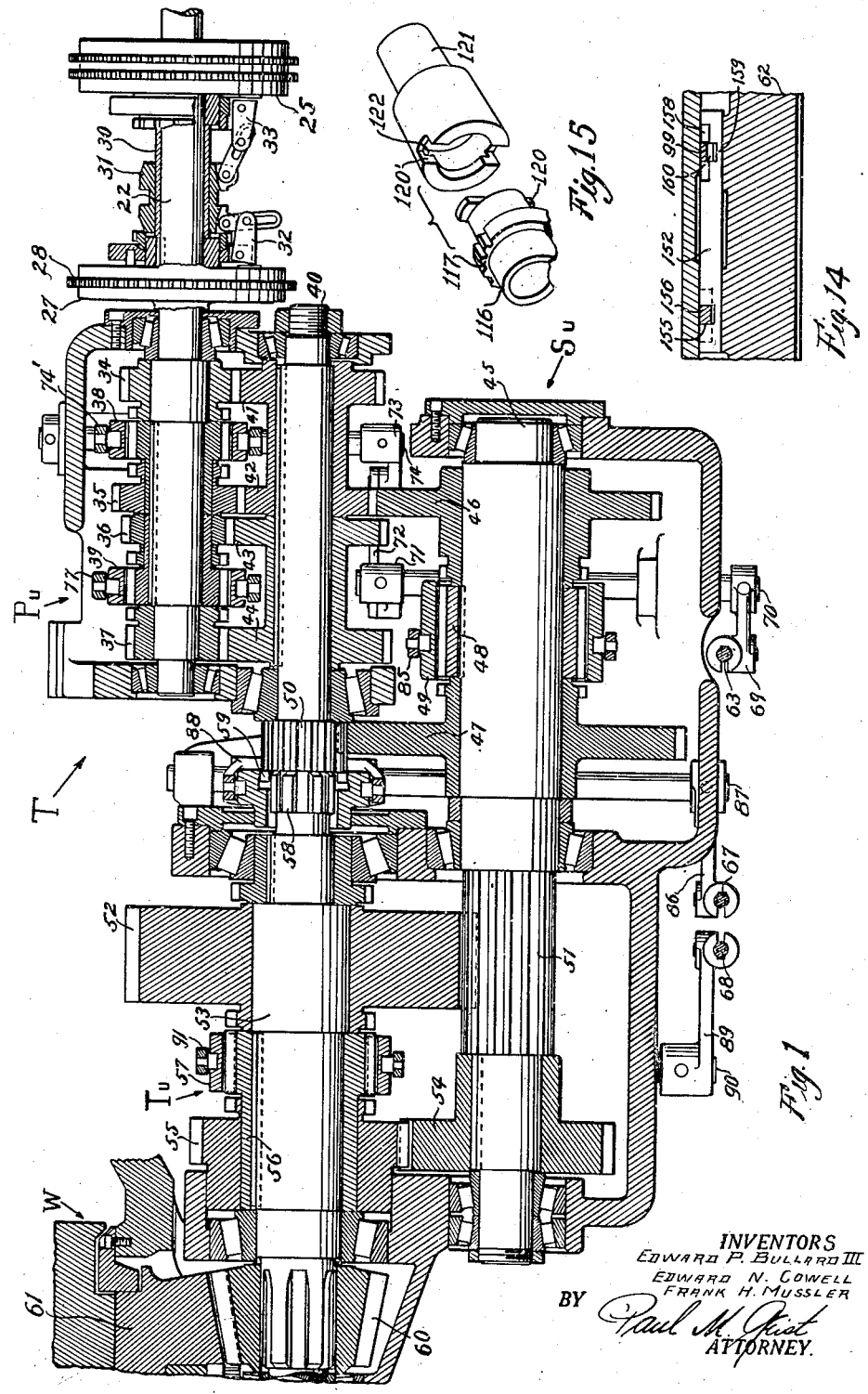

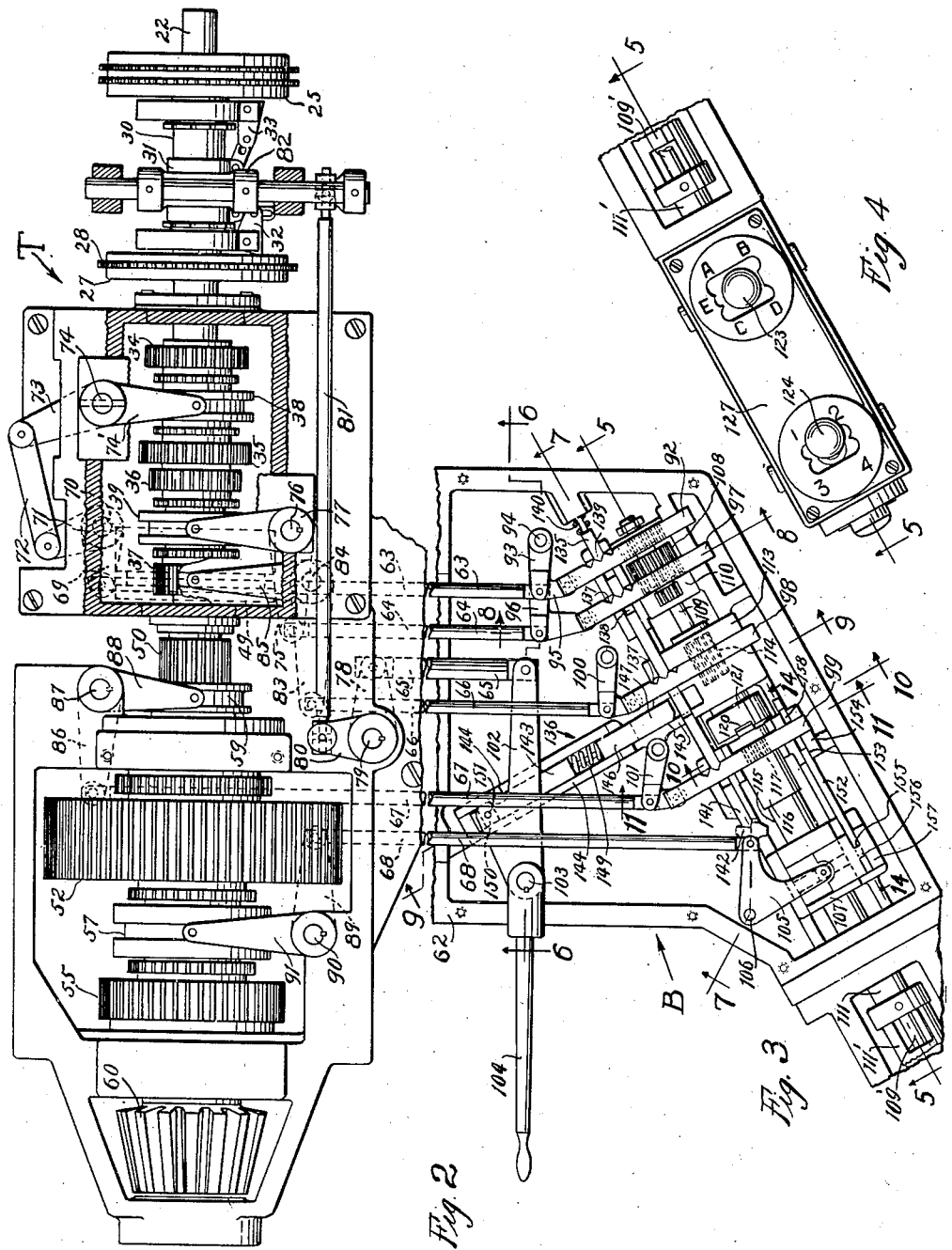

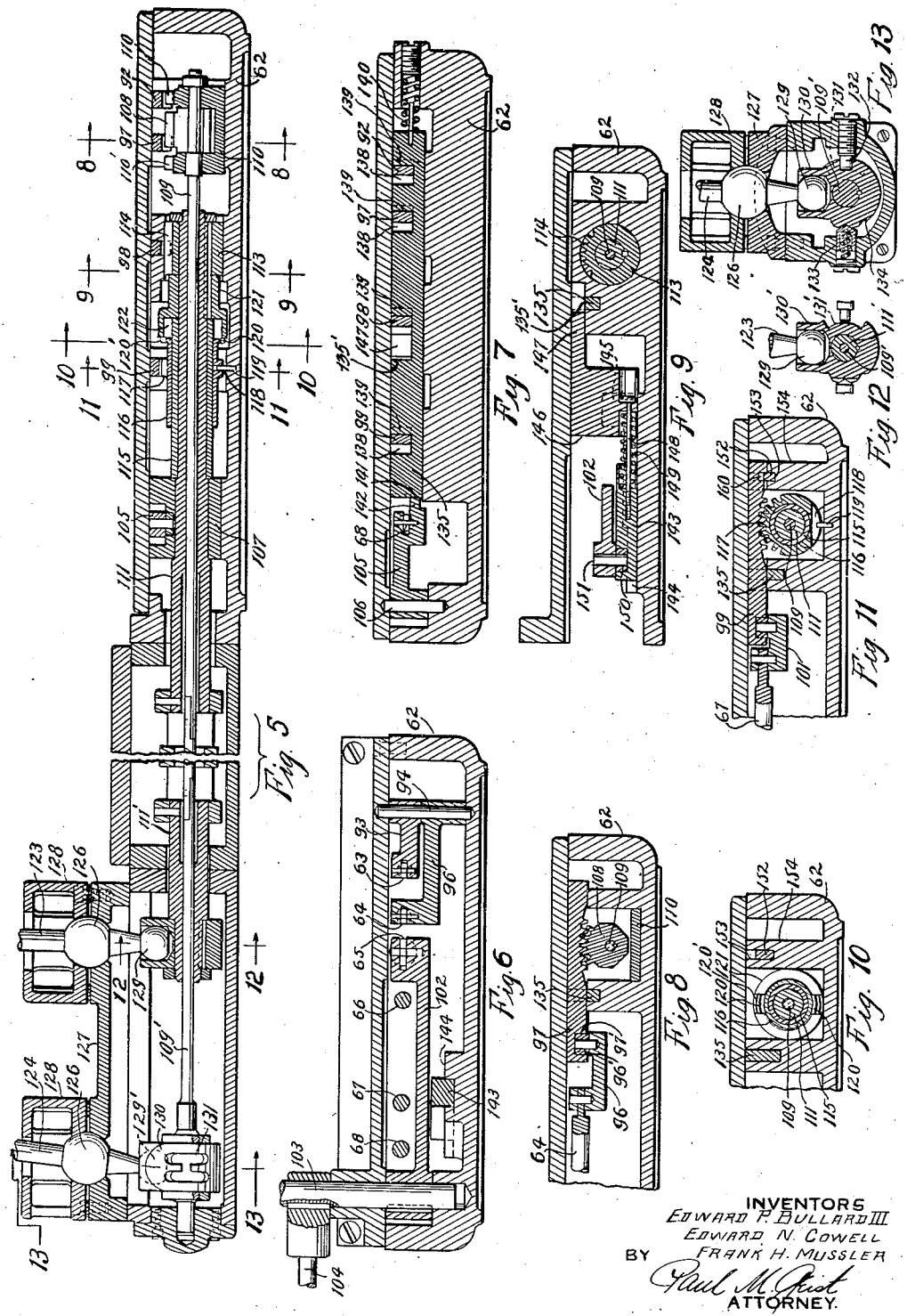

2,355,626

UNITED STATES PATENT OFFICE 2,355,626

TRANSMISSION

Edward P. Bullard, III, Fairfield, and Edward N. Cowell and Frank H. Mussler, Stratford, Conn., assignors to The Bullard Company, a corporation of Connecticut Original application November 25, 1939, Serial No. 306,122. Divided and this application February 15, 1941, Serial No. 379,022

17 Claims. (Cl. 192—3.5)

This invention relates to transmissions generally, and particularly to mechanisms for establishing various gear combinations within a transmission.

This application is a division of application Serial Number 306,122 filed on November 25, 1939, in the names of Edward P. Bullard, III, Edward N. Cowell and Frank H. Mussler.

Among the objects of this invention include, the provision of a mechanism for establishing various gear combinations within a transmission independently of any other gear combination therein; the provision of a mechanism for establishing a selected gear combination within a transmission without passing through any other gear combination therein; the provision of a transmission in which the main clutch cannot be engaged until a selected gear combination within said transmission has been fully established; and the provision of a transmission having a fully interlocked mechanism for establishing selected gear combinations therein.

The above, as well as other objects and novel features of the invention will become apparent upon a consideration of the following specification and the accompanying drawings in which:

Fig. 1 is a sectional elevational view of a transmission embodying the principles of the present invention;

Fig. 2 is a plan view of the transmission shown in Fig. 1;

Fig. 3 is a plan view of a gear-shifting bracket with the cover plate removed;

Fig. 4 is a plan view of the forward end of the gear shifting bracket disclosed in Fig. 3;

Fig. 5 is a sectional elevational view taken substantially along lines 5—5 of Figs. 3 and 4;

Figs. 6 and 7 are sectional elevational views taken substantially along lines 6—6, and 7—7 of Fig. 3;

Figs. 8 to 11 inclusive are sectional elevational views taken substantially along the lines 8—8, 9—9, 10—10 and 11—11 of Figs. 3 and 5;

Fig. 12 is a partial sectional elevational view taken substantially along line 12—12 of Fig. 5;

Fig. 13 is a sectional elevational view taken substantially along line 13—13 of Fig. 5;

Fig. 14 is a section substantially along line 14—14 of Fig. 3; and

Fig. 15 is an enlarged perspective view of a portion of the structure of Fig. 5 looking in the direction of the arrows along line 16—16.

Referring to Fig. 1, the transmission comprises a shaft 22 adapted to support a multiple-disc friction clutch 26. A friction brake 27 is likewise supported on the drive shaft 22, and comprises a friction disc 28 having peripheral teeth adapted to mesh with internal teeth disposed about an opening in a fixed bracket not shown. Both the clutch 25 and the brake 27 are provided with metal discs splined to the drive shaft 22 on each side of the friction discs. A sleeve 30 surrounds the shaft 22 between the clutch 25 and the brake 27, and supports a slidable grooved spool 31 and certain of the movable metal discs of the clutch 25 and brake 27 whereupon axial movement of spool 31 alternately engages and releases the clutch 25 and brake 27.

The transmission is adapted to drive a driven member W at different predetermined speeds throughout a given range. In the present embodiment of the invention it is desirable that the different specific speeds at which the member W is adapted to be driven shall vary substantially in accordance with a geometrical progression. Furthermore, it is desirable to employ as few gears as possible within the transmission.

Referring to Fig. 1, the above desirable features have been attained by employing a primary unit $Pu$, a secondary unit $Su$ and a tertiary unit $Tu$. These units are designed and constructed so that only parallel shafts are employed throughout the transmission, and certain gears are common to various units. Additionally, the gear combinations of the various units are designed so that the different speeds of the transmission will increase substantially in accordance with a geometrical progression. When it is desired to cover a specific range of speeds with a given number of changes of speed, it is first necessary to determine the geometrical constant for the desired speed range. This is determined by multiplying the lowest desired speed by the geometrical constant raised to a power equal to the number of desired changes of speed minus 1 and letting that product equal the maximum speed desired from which equation the geometrical constant may be obtained.

The gear combinations of the various units are designed so that the ratio of any gear combination in the primary unit divided by the ratio of a gear combination therein which produces the next lower speed in said primary unit is equal to the first power of the geometrical constant; the ratio of any gear combination in the secondary unit divided by the ratio of a gear combination therein which produces the next lower speed in said secondary unit is equal to the fourth power of the geometrical constant; and the ratio of any gear combination in the tertiary unit divided by the ratio of a gear combination therein which produces the next lower speed in said tertiary unit is equal to the eighth power of the geometrical constant.

Four spur gears 34, 35, 36, 37 are freely journaled on the drive shaft 22, and each gear is provided with positive-action clutch engaging teeth arranged between gears 34, 35, and 36, 37. Slidable gear-engaging means 38 and 39 are keyed to the driving shaft 22 and are located between respective gear sets 34, 35, and 36, 37. Thus, movement of the engaging means 38, 39 to the left or to the right will respectively connect to shaft 22 either gears 35, 37 or gears 34, 36. A shaft 40 parallel to shaft 22 is provided in the transmission and is adapted to support four gears 41, 42, 43 and 44 arranged in units of two. These last-mentioned gears are keyed to the shaft 40 and each is retained in constant mesh with gears 34, 35, 36 and 37 respectively. The gears 34, 35, 36 and 37 and 41, 42, 43 and 44, comprise the primary unit Pu of the transmission.

An additional parallel shaft 45 is provided in the transmission on which gears 46 and 47 are freely journaled. The gears 46 and 47 are likewise provided with positive-action clutch-engaging teeth on adjacent sides. A positive-action gear-engaging means 48 is keyed to the shaft 45 and is provided with a slidable element 49 for selectively engaging the gears 46 and 47. The gear 46 on shaft 45 is adapted to be maintained in constant mesh with the gear 42 on shaft 40, while the gear 47 on shaft 45 is adapted to be maintained in constant mesh with an additional gear 50 integral with the shaft 40. Gears 46, 42, 47 and 50 comprise the secondary unit Su. The shaft 40 acts as a common shaft between the primary and secondary units, and gear 42 serves a dual function in meshing with gear 35 of the primary unit and gear 46 of the secondary unit. By selectively shifting the means 38 and 39, shaft 40 can be driven at four separate and distinct speeds from the drive shaft 22. Furthermore, the shaft 45 may be driven at eight separate and distinct speeds from the drive shaft 22 by selectively shifting the means 38, 39 and 49.

The shaft 45 of the secondary unit is extended and forms one shaft of the tertiary unit Tu. The extended portion of shaft 45 is provided with gear teeth 51 adapted to be maintained in constant mesh with a gear 52 freely journaled on a driven shaft 53 forming the other shaft of the tertiary unit Tu. Likewise, the extended portion of shaft 45 fixedly supports a gear 54 adapted to be maintained in constant mesh with a gear 55 freely journaled on a sleeve 56, which latter is keyed to the driven shaft 53. Each of the gears 52 and 55 is provided with positive-action engaging-means facing each other and disposed between the two gears. A shiftable engaging means 57 splined to sleeve 56 is provided between the last two gears for selectively engaging either. Inasmuch as the shaft 45 may be driven at eight different speeds from the diving shaft 22, it follows that selectively shifting the means 57 of the tertiary unit Tu will impart sixteen separate and distinct speeds of rotation to the driven shaft 53.

The driven shaft 53 is arranged coaxially with the shaft 40. This arrangement makes it possible to produce an additional four speeds of rotation of the driven shaft 53 from the driving shaft 22 by employing a single additional gear. Accordingly, the gear 50, fixed to shaft 40, is made longer than would be necessary for its proper meshing with gear 47. The end of driven shaft 53 adjacent the gear 50 is provided with a spline 58. An internal ring gear 59 is splined on the end of driven shaft 53 and is adapted selectively to be moved axially to directly connect driven shaft 53 with shaft 40.

From an inspection of Fig. 1, it is apparent that the driven shaft 53 may be driven at 20 different speeds while employing gears that remain constantly in mesh with their mating gears, thereby avoiding the difficulties common with constructions employing diving keys. Furthermore, the use of a common shaft between the secondary and primary units as well as common gears between units, together with the arrangement of the driven shaft 53 coaxial with shaft 40 of the primary and secondary units, tends to reduce to a minimum the number of gears in the transmission for a given number of different speeds of the driven member. Additionally, each gear combination in the primary, secondary and tertiary units is so designed that it may be used with any other gear combination in any other unit and the ability to employ the various gear combinations of each unit over and over further minimizes the number of gear combinations required for a given number of specific speeds of the driven shaft 53.

The driven shaft 53 is provided with a bevel gear 60 at its end opposite that which contains spline 58. This bevel gear 60 meshes with a bevel ring-gear 61 fixed to the under surface of the driven member W.

The various gear combinations of the primary, secondary and tertiary units are selectively engaged and disengaged by the shiftable means 38, 39, 49, 57 and 59. The clutch 25 and the brake 27 are alternately engaged and disengaged by the action of the slidable spool 31. All of these elements are selectively shifted by the movement of a plurality of rods within a gear-shifting bracket B and are connected to said shiftable elements through linkages to be described.

Referring to Figs. 2 and 3, the bracket B comprises a relatively flat irregular-shaped box-like element 62 adapted to be bolted to the bottom of a housing for the transmission. The walls between the box 62 and said housing are provided with openings through which a series of six reciprocable rods 63, 64, 65, 66, 67 and 68 are adapted to pass.

The rod 63 extends into the transmission housing to a point on the far side of the transmission and is connected to a link 69 that is fixed to a vertically-disposed shaft 70. The upper end of the shaft 70 has fixed to it a link 71 which forms a bell-crank with the link 69. Link 71 is connected to a link 72 which in turn is connected to a link 73 fixed to the lower end of a shaft 74. The upper end of a shaft 74 fixedly supports a yoke 74' that engages the shiftable element 38 so that reciprocable movement of the rod 63 moves the element 38 to the right and left thereby selectively connecting gears 34 and 35 to the driving shaft 22.

Rod 64 extends into the transmission housing and is connected to a link 75 which latter is fixed to a vertically-disposed shaft 76 extending upwardly within the transmission housing to a point adjacent the primary unit Pu. The upper end of the rod 76 rigidly supports a yoke 77, that engages the shiftable element 39.

The rod 65 is pivoted to a link 78 that is rigidly connected to a vertically-disposed shaft 79.

The shaft 79 extends vertically within the transmission housing to a point near the top of the transmission. The upper end of shaft 79 fixedly supports a link 80 that is pivoted to a pull rod 81 connected to an arm of an oscillatable yoke 82. The yoke 82 engages the spool 31 on the driving shaft 22 between the clutch 25 and brake 27.

Rod 66 extends into the transmission housing where it is connected to a link 83 fixed to a pivot shaft 84. The pivot shaft 84 has rigidly fixed thereto a yoke 85 which is adapted to engage the shiftable element 49 of the secondary unit.

Rod 67 extends into the transmission housing to the far side of the transmission where it is connected to a link 86 rigidly fixed to a pivot shaft 87. The shaft 87 fixedly supports a yoke 88 that engages the shiftable element 59 for directly connecting the driven shaft 53 with the shaft 40.

The rod 68 extends into the transmission housing and is connected to a link 89 fixed on a pivot shaft 90. The shaft 90 rigidly supports a yoke 91 that engages the shiftable element 57 of the tertiary unit.

From the foregoing it is apparent that selective reciprocation of the rods 63, 64, 65, 66, 67 and 68 will set up various gear combinations in the transmission to provide twenty different rates at which the driven shaft 53 may be rotated. Certain of these rods are adapted to be reciprocated by racks angularly related with respect to their corresponding rods.

Referring to Figs. 3 and 6, the rod 63 is connected to a rack 92 within the box 62 by a crank member 93, pivoted on a vertically disposed shaft 94. The crank 93 includes a rigid arm 95 that forms a cross-head pivotal-connection with one end of the angularly related rack 92 which insures substantially axial movement of the rack 92 and rod 63 for limited motion. Similarly, rod 64 is connected to a crank 96 which likewise is pivoted on the shaft 94, and a rack 97 is connected to crank 96 in the same manner as rack 92 is connected to the crank 93. Referring to Fig. 8, the crosshead pivotal connection includes a square slide 96' pivoted to the crank 96 that is adapted to slide in a transverse slot 97' in the one end of rack 97. Rods 66 and 67 are similarly connected to racks 98 and 99 through cranks 100 and 101, respectively, in the same manner as racks 92 and 97 are connected to cranks 93 and 96.

The rod 65 which actuates the clutch 25 and brake 27 is connected to a bell-crank lever 102 located in the box 62. The lever 102 is pivoted on a vertically disposed shaft 103, to which is also fixed a relatively long hand-operated lever 104.

The rod 68 which actuates the shiftable element 57 of the tertiary unit $Tu$ is connected to a bell-crank lever 105 pivoted within the box 62 on a vertically disposed shaft 106. The opposite end of the bell crank 105 is connected to a bearing 107, to be described later. The racks 92, 97, 98 and 99 are adapted to be reciprocated along their longitudinal axes, while the bell crank 105 is adapted to be pivoted about the shaft 106 by a movement of bearing 107 in a direction transversely to the movement of said racks 92, 97, 98 and 99.

Referring to Figs. 5 and 8 of the drawings, the racks 92 and 97 are adapted to be reciprocated separately and selectively by a common driver 108, and while either rods 92 or 97 is out of engagement with the driver, it is adapted to be held against movement by an inter-locking mechanism. A shaft 109, extending at right angles to the longitudinal axes of racks 92 and 97, is provided at its one end with a slidable, non-rotatable yoke member 110. The common driver 108 for the racks 92 and 97 is in the form of a mutilated gear keyed to shaft 109 and its teeth mesh with rack teeth formed on the under sides of racks 92 and 97. Each of the legs of the yoke 110 is provided with gear teeth 110' which are adapted to mesh with the rack teeth on the racks 92 and 97. Oscillation of the shaft 109 causes the driver 108 to reciprocate the racks 92 or 97 with which it is in engagement, while at the same time the teeth 110' on the legs of the yoke 110 are adapted to prevent the movement of the rack 92 or 97 which is not in driving engagement with the driver 108. Accordingly, by shifting the shaft 109 axially and then oscillating it, the racks 92 and 97 can be selectively reciprocated to actuate the shiftable elements 38 and 39 of the primary unit.

From an inspection of Fig. 1, it is apparent that shiftable elements 49 and 57 must be in engagement with one of the gear combinations of the secondary and tertiary units at the same time in order to impart a drive to the driven shaft 53. Accordingly, the rods 68 and 66 of Fig. 3 must be actuated in order to effect driving of the driven member through the secondary and tertiary units. Referring to Fig. 5, a relatively long sleeve 111 extends into the box 62 and telescopes the relatively long shaft 109. The sleeve 111 is provided with two bearing elements, namely, the bearing 107 and another bearing 113, both of which permit axial shifting of said sleeve relatively to shaft 109, as well as oscillating movement of said sleeve. The bearing 107 which is fixed to the bell crank 105 (Fig. 3), is also fixed to the sleeve 111. The bearing element 113 includes a relatively long gear portion 114 adapted to remain in mesh with the rack teeth on the under surface of the rack 98 at all times irrespective of the axial position of the sleeve 111. Accordingly, the sleeve 111 may be moved from its one axial limiting position, wherein the element 57 engages either gear 55 or 52, through a neutral position, to its other axial limiting position wherein the element 57 will engage the other of said gears 55 and 52. During this entire axial movement of sleeve 111, the rack 98 will be in positive mesh with the gear 114. This arrangement permits the reciprocation of the rack 98 to cause the element 49 of the secondary to engage either gears 46 or 47 whenever gears 52 or 55 are engaged by the element 57, thus completing a driving train through the secondary and tertiary units to the driven shaft 53.

Reciprocation of the rod 67 within the box 62 (Fig. 3) is adapted to engage and disengage the direct drive between the driven shaft 53 and the shaft 40 common to the primary and secondary units. This direct drive must not be initiated when a complete drive is established through the secondary and tertiary units. Therefore, it must be a condition precedent to establishing the direct drive that either the elements 49 or 57 be in a neutral position. In as much as the bearing 107 that controls the movement of element 57 is moved axially with sleeve 111 between two limiting positions through a medial neutral position, it is apparent that the reciprocation of link 99 should only occur when the bearing 107 is in said neutral position. This has been accomplished by providing a spacing sleeve 115 on the sleeve 111 on which a driving element 116 is journaled. Referring to Figs. 5, 10, and 11, the element 116 comprises a sleeve having a gear portion 117 formed on its periphery. It is also provided with a peripheral slot 118 that cooperates with a pin 119, fixed to the box 62, to permit limited oscillation and to prevent axial movement of the member 116. Driving element 116 is further provided with a pair of diametrically-disposed ears 120 (Fig. 10) which are adapted to engage the side walls of a slot 120' in a connecting element 121. The element 121 is fixed to the sleeve 111 and is provided with an undercut recessed portion 122 into which the ears 120 of the driver 116 are adapted to pass upon axial shifting of the sleeve 111 beyond a predetermined point. The arrangement and construction permits the ears 120 to engage the side walls of the slot 120' in the element 121 when the bearing 107 is in its neutral position. Axial shifting of bearing 107 to either side of this neutral position will prevent ears 120 from engaging the side walls of slot 120' in the element 121. Therefore, the sleeve 111 may be selectively shifted axially and oscillated to transmit the drive of the primary through the secondary and tertiary units on the one hand, and to transmit said drive directly to the driven member as desired.

Referring to Fig. 1, it is evident that the driven shaft 53 and the sleeve 56 will be rotated at a relatively high rate of speed when the direct drive is effective. Should the gears 52 and 55 remain idle during this time, excessive wear would occur tending to make the circular gear journals egg-shaped. Accordingly, the reason for making the gear portion 114 of element 113 long enough to maintain it always in mesh with the teeth of rack 98 is to cause gears 51 and 54 to rotate gears 52 and 55, respectively when the direct drive is effective to more evenly distribute the wear between gear 52 and shaft 53, and between gear 55 and sleeve 56.

Referring to Fig. 5, the sleeve 111 and shaft 109 are adapted to be axially shifted and oscillated by hand levers 123 and 124 respectively. These levers are constructed and arranged to transmit their movement in an amplified form to the shaft 109 and sleeve 111, and to prevent the passage of dirt and chips into, or the leakage of lubricant from within the box 62. Referring to Fig. 13, a spherical portion 126 is provided between the ends of hand lever 124 that forms a ball and socket fulcrum with a cover plate 127 for box 62 and an indicator plate 128, thereby preventing the loss of lubricant from, or the entrance of dirt and chips into said box. An additional spherical portion 129' is provided at the lower end of the lever 124 that cooperates with a socket 130 keyed to a coaxial extension 109' of shaft 109. The distance between the spherical portions 126 and 129' is greater than that between the portion 129' and the center of extension 109'. Accordingly, the degree of movement of the lever 124 that is transmitted to the extension 109' will be amplified so that a substantial angular turning or axial shifting of shaft 109 may be effected with a relatively small movement of lever 124. The one side of socket 130 is provided with an H-shaped groove 131 in its side wall into which the one end of a pin 132 is adapted to fit. This construction requires the lever 124 to be returned to a neutral position before the shaft 109 can be axially shifted. The lever 124 is held in either of its positions by the cooperation of a spring-pressed detent 133 and a series of notches 134 on the side of socket portion 130 opposite that which contains the H-shaped groove 131.

The shift lever 123 is mounted within the box 62 and is connected to a coaxial extension 111' of sleeve 111 in substantially the same manner as lever 124 is connected to the extension 109'. However, a socket 130' (Fig. 12), similar to socket 130, is keyed to extension 111' and is provided with a recess 131' instead of an H-shaped slot. The H-shaped slot is not necessary to insure lever 123 returning to a neutral position prior to shifting the sleeve 111 axially since the ears 120 of the member 116 (Figs. 5 and 10) must be aligned with the slot 120' in the connecting element 121 prior to such shifting of sleeve 111.

When a given gear combination within the transmission has been set up by shifting the levers 123 and 124, it is necessary to manually shift the clutch 25 into engagement and to simultaneously release the brake 27. This dual function is accomplished by reciprocation of the rod 65 within the housing 62 (Fig. 3). However, it is desirable to provide an interlock between the main clutch shifting rod 65 and all of the gear-engaging shifting means 38, 39, 49, 57 and 59, so that upon shifting the gear-engaging means, should any gear combination fail to effect complete engagement, the clutch 25 cannot permanently be engaged. It often occurs that the teeth of the engaging means fall tooth on tooth, thus preventing engagement of a selected gear combination. Therefore, it is desirable to provide means for temporarily engaging the clutch 25 to effect relative movement between the teeth of the gear-engaging means should the above condition arise.

The above-referred to interlocking mechanism comprises a common interference rod 135 having an aperture 135' through which a portion of a link 136 is adapted to pass. The link 136 is connected to the bell crank 102 that is manually operated by lever 104 to effect the shifting of the clutch 25 and the brake 27. The link 136 and the aperture 135' in the interference rod 135 must be in alignment before the former will pass through it. Each of the racks 92, 97, 98 and 99 is provided on its one side with notches or cam surfaces 137, equal in number to the positions it will assume during its normal movement while selectively shifting the gear-engaging means. The common interference rod 135 is provided with slots 138 in its top side (Fig. 7) through which the racks 92, 97, 98 and 99 are adapted to pass. Each of the slots 138 in the rod 135 contains one side wall that is formed as an arrowhead or cam 139. A spring 140 bears against the one end of the common interference rod 135, tending to urge it to a position where the arrowheads or cams 139 seat in the bottom of the notches or cam surfaces 137 in the sides of the racks 92, 97, 98 and 99. In the event that any of the racks 92, 97, 98 and 99 are not in position for the arrowheads 139 perfectly to seat within the notches 137, the rod 135 will be moved to the right against the action of the spring 140 as viewed in Fig. 3 causing mis-alignment of the aperture 135' within rod 135 and the link 136. Accordingly, under such conditions, the link 136 will abut against the side of the rod 135, thereby preventing actuation of the bell crank 102, and consequently, preventing the engagement of the clutch 25. The end of the rod 135 adjacent the bearing 107 is provided with an arrowhead or cam 141 adapted to cooperate with a notched cam surface formed in an abutment 142 integral with the end of one arm of the bell-crank 105.

The surfaces of the arrowhead or cam 141 and the notched cam surface in abutment 142 are angularly related so that slight movement of the bearing 107 in either direction from its medial or neutral position causes shifting of the interference rod 135 thereby disturbing alignment of the aperture 135' therein with the link 136. The abutment 142 is of such length that it will clear the arrowhead 141 when the bearing 107 is moved sufficiently in either direction to effect complete engagement of the element 57 with either gears 52 or 55. Accordingly, when a complete shift of element 57 is made, rod 135 will be returned by spring 140 to the position where its aperture 135' aligns with the link 136.

Referring to Figs. 3 and 9, the link 136 which serves as the interlock between the gear-combination engaging means and the main clutch 25 is constructed to permit temporary engagement of the main clutch even though the link 136 abuts against the side of the interference rod 135 instead of passing through the aperture 135' therein. Accordingly, the link 136 is in two parts, one portion 143 of which is guided by guides 144 constructed on the base of the box 62. A similar pair of guides 145 is likewise mounted on the base of the box 62 in alignment with the guides 144, and slidably receive the other portion 146 of link 136. The portion 146 is provided with a finger portion 147 adapted to pass through the aperture 135' in the interference link when the two become aligned. The ends of portions 143 and 146 of link 136 that face each other are bored, counterbored, and tapped to receive a screw 148 and a spring 149. The spring 149 forces the portion 146 away from the portion 143, but permits the portions 146 and 143 to approach each other if the finger 147 abuts the side of the interference rod 135 and continued force is applied to the portion 143. The end of portion 143 opposite that which receives the spring 149 is adapted to be connected to the bell-crank lever 102 by a crosshead connection including a rectangular block 150 slidingly supported in a groove in the end of the portion 143 at right angles to the guides 144. A pin 151 mounted in the rectangular block 150 pivotally engages the lever 102. Therefore, movement of the hand lever 104 to cause permanent engagement of the main clutch 25 will occur only if the aperture 135' in rod 135 is in alignment with the finger portion 147 of the link 136; otherwise, the finger 147 will abut the side of rod 135 and movement of the lever 104 will cause compression of the spring 149, effecting temporary engagement of the clutch 25 However, should complete engagement of the selected gear combination fail to occur, spring 140 will cause separation of the parts 143 and 146 upon release of the lever 104, thereby causing clutch 25 to become disengaged.

An additional interlock is provided between the shifting means 59 for establishing the direct drive and the means 57 of the tertiary unit to prevent either one of said means from being operated if the other is in engagement with its respective gears. Referring to Figs. 3, 11 and 14, the interlock comprises a rod 152 connected to the slidable bearing 107 and guided by a groove 153 in a support 154 integral with the base of box 62. The bar 152 is provided with a slot 155 adapted to receive a cross bar 156 of an H-shaped connector plate 157 slidably mounted in a recessed portion of bearing 107. The rod 152 is provided with a relatively long slot 158 and an additional slot 159, the width of which just clears the rack 99. The rack 99 is provided with a slot 160 the width of which just clears the rod 152 and when aligned with the slot 159 of rod 152 clears the depth of rack 99. Accordingly, it will be impossible to shift rack 99 unless the slot 159 on rod 152 and the slot 160 on rack 99 are in alignment. The arrangement and construction is such that these slots will be aligned only when the bearing 107 is in a position where shiftable element 57 is in neutral and the rack 99 is in a position where shiftable element 59 is in neutral, whereupon either rack 99 or bearing 107 may be moved, and shifting of either cause locking of the other in neutral position.

Although the various features of the improved transmission have been shown and described in detail to fully disclose one embodiment of this invention, it will be evident that numerous changes may be made in such details, and certain features may be used without others, without departing from the principles of the invention.

What is claimed is:

1. In a transmission including a plurality of movable elements, means for moving said elements comprising an oscillatable axially-movable member; means associated with said member for moving one of said elements when said member is moved from its one axial limiting position to its other axial limiting position; and means associated with said member for moving another of said elements only when said member is substantially mid-way between its axial limiting positions and upon oscillation of said member.

2. In a transmission including a plurality of movable elements, means for moving said elements comprising an oscillatable axially-movable member; means associated with said member for moving one of said elements when said member is moved from its one axial limiting position to its other axial limiting position; means associated with said member for moving another of said elements when said member is in any of its axial positions and oscillated; and means associated with said member for moving a plurality of said elements when said member is substantially midway between its axial limiting positions and oscillated.

3. In a transmission including a plurality of movable elements, means for moving said elements to effect the operation of said transmission comprising a plurality of oscillatable axially-movable members adapted to be moved throughout their entire axial and oscillatable movements independently of each other; means associated with one of said members for engaging any one of a plurality of said elements upon axial movement of said member and for moving the element it engages upon oscillation of said member; and means associated with the other member for moving another of said elements during its axial movement and at least one other element during its oscillation.

4. In a transmission including a plurality of movable elements, means for moving said elements to effect the operation of said transmission comprising a plurality of oscillatable axially-movable members adapted to be moved throughout their entire axial and oscillatable movements independently of each other; means associated with one of said members for engaging any one of a plurality of said elements upon axial movement of said member and for moving it upon oscillation of said member; means associated with the other member for moving another of said elements during its axial movement, another element during its oscillation and still another element during its oscillation when said member is substantially midway between its axial limits.

5. A transmission comprising in combination a driving and a driven member; a primary, secondary and tertiary unit each including a plurality of gear combinations between said driving and driven members; means for engaging gear combinations in each unit comprising a pair of telescoping axially-movable oscillatable shafts adapted to be moved throughout their entire axial and oscillatable movements independently of each other, one of which is adapted to control the engagement of gears in the primary, and the other of which is adapted to control the engagement of gears in the secondary and tertiary units.

6. A transmission comprising in combination a driving and a driven member; primary, secondary and tertiary units including a plurality of gear combinations between said driving and driven members; a direct drive between said primary unit and said driven member; means for engaging gear combinations in each unit as well as for effecting engagement and dis-engagement of said direct drive, comprising a pair of axially-movable, oscillatable shafts adapted to be moved throughout their entire axial and oscillatable movements independently of each other, one of which is adapted to control the engagement of gears in the primary, and the other of which is adapted to control the engagement of gears in the secondary and tertiary units and to control the engagement and disengagement of said direct drive.

7. In a transmission including a driving and driven member, a plurality of gear combinations and an engageable and disengageable direct drive; an oscillatable axially-movable member for controlling the operation of said transmission; means associated with said member for engaging a gear combination in either of its axial limiting positions and while in either of said positions for engaging a cooperating gear combination in either of its oscillatable positions; and additional means associated with said member for engaging said direct drive when said member is oscillated while at a point substantially midway between its axial limiting positions.

8. In a transmission including a driving and driven member, a plurality of variable-speed gear combinations; a plurality of shiftable means for engaging and disengaging said gear combinations; a housing associated with said transmission; a plurality of elements extending from within said housing to the outside thereof and adapted to effect selective engagement of said variable-speed gear combinations within the transmission; means for selectively moving said elements comprising an axially-movable oscillatable member; means on said member for moving at least one of said elements upon movement of said member from its one axial limiting position through a neutral position to its other axial limiting position; and means on said member for moving a plurality of other of said elements upon oscillatable movement of said member, said last mentioned means being effective to move at least one of said plurality of other of said elements only when said member is in one of its axial positions; and means for operating said member.

9. In a transmission including a driving and driven member; a plurality of gear combinations adapted to be selectively engaged; a housing associated with said transmission; a plurality of elements extending from within said housing to the outside thereof and adapted selectively to engage said plurality of gear combinations within the transmission; means for selectively moving said elements comprising a primary and a secondary member, said members being axially movable and oscillatable; common means on said primary member for moving certain of said elements upon oscillating movement being imparted to said primary member, and adapted to be selectively moved into operative position with respect to each of said certain elements upon axial movement of said primary member; said secondary member being provided with means for moving one of said elements upon movement of said secondary member from its one axial limiting position through a neutral position to its other axial limiting position; means for moving other elements upon oscillatable movement of said secondary member, said last mentioned means being effective to move at least one of said elements only when said secondary member is in its neutral axial position; and means for operating said members.

10. In a transmission, a driving shaft; a driven shaft; a plurality of gear combinations between said driving and driven shafts; a plurality of shiftable elements adapted to establish selected gear combinations; a main clutch; releasable mean for effecting engagement of said main clutch; and means between said shiftable elements and said releasable means for preventing sustained engagement of said main clutch upon release of said releasable means except when all of said shiftable elements are in predetermined positions.

11. In a transmission, a plurality of shiftable means for establishing various gear combinations therein; a plurality of movable elements for shifting said shiftable means; means for selectively moving said elements; a member; means for moving said member; and means between said elements and member provided with an opening; means on said member for cooperating with said opening when the two are in alignment; and means on said elements for preventing the alignment of the opening and the means on said member until said elements are in predetermined positions.

12. In a transmission, a plurality of shiftable means for establishing various gear combinations therein; a plurality of movable elements adapted to move said shiftable means and including cam surfaces; means for moving said elements; a member; means for moving said member; common means having cam surfaces adapted to cooperate with the cam surfaces on said elements and provided with an opening for receiving projecting means on said member when the opening and projecting means become aligned; and means for resiliently urging said common means toward a position where said opening and projecting means become aligned.

13. In a transmission including a driving and driven member; a plurality of gear combinations; a plurality of means for selectively engaging certain gear combinations; a main clutch for said transmission; a gear shifting bracket associated with said transmission including a plurality of elements associated with said gear engaging means; means for selectively operating said elements; separate releasable means for operating said main clutch; a member adapted to cooperate with all of said elements for preventing sustained engagement of said main clutch upon release of said releasable means except when said elements are in predetermined positions; and means associated with said clutch-operating means adapted to cooperate with said member when said elements are in said predetermined positions to facilitate sustained engagement of said main clutch.

14. In a transmission, including a driving and driven member; a plurality of gear combinations; a plurality of means for selectively engaging certain gear combinations; a main clutch for said transmission; a gear-shifting bracket associated with said transmission and including a plurality of elements associated with said gear engaging means; means for selectively operating said elements; separate means for operating said main clutch; an apertured member adapted to cooperate with all of said elements for preventing the engagement of said main clutch until said elements are in predetermined positions; means associated with said clutch-operating means adapted to cooperate with the aperture in said member when said elements are in said predetermined positions to facilitate engagement of said main clutch; and means for resiliently urging said member toward a position where its aperture will be in cooperative position with respect to the means associated with the clutch-operating means.

15. In a transmission including a driving and driven member; a plurality of gear combinations between said members; a plurality of means for selectively engaging certain of said gear combinations; a main clutch for said transmission; a plurality of racks connected to said gear-engaging means; means for selectively operating said racks; separate releasable means for operating said main clutch; a lever connected to said main clutch operating means and adapted to abut against means which prevents sustained engagement of said main clutch upon release of said clutch-operating means except when all of said racks are in predetermined positions; and resilient means between said lever and abutment means for facilitating temporary engagement of said main clutch when said racks are not in said predetermined positions.

16. In a transmission including driving and driven shafts; a plurality of gear combinations between said shafts; a plurality of means for selectively engaging certain of said gear combinations; a main clutch for said transmission; a plurality of racks connected to said gear-engaging means; means for selectively operating said racks; separate means for operating said main clutch; and a link connected to said main clutch-operating means including a portion adapted to abut against a member that cooperates with all of said racks, said member having an aperture adapted to be aligned with said portion to effect its passage through said member when said racks are in predetermined positions.

17. In a transmission having a driving shaft, a driven shaft, a plurality of gear combinations between said shafts, a main clutch and a releasable operating lever therefor; elements within said transmission; means for shifting said elements to establish different of said gear combinations comprising a plurality of axially-movable, oscillatable members; means between said members and elements for transmitting the movement of said members to said elements; and common means adapted to cooperate with all of the means between said members and elements and the clutch-operating lever for preventing sustained engagement of said clutch upon release of said operating lever except when all of the means between said members and elements are in predetermined positions.

EDWARD P. BULLARD, III.
EDWARD N. COWELL.
FRANK H. MUSSLER.